(12) United States Patent
Görg

(10) Patent No.: US 11,181,928 B2
(45) Date of Patent: Nov. 23, 2021

(54) METHOD FOR OPERATING A TRANSPORTATION VEHICLE AND TRANSPORTATION VEHICLE

(71) Applicant: VOLKSWAGEN AKTIENGESELLSCHAFT, Wolfsburg (DE)

(72) Inventor: Steffen Görg, Wolfsburg (DE)

(73) Assignee: Volkswagen Aktiengesellschaft

( * ) Notice: Subject to any disclaimer, the term of this patent is extended or adjusted under 35 U.S.C. 154(b) by 152 days.

(21) Appl. No.: 16/106,953

(22) Filed: Aug. 21, 2018

(65) Prior Publication Data
US 2019/0064822 A1 Feb. 28, 2019

(30) Foreign Application Priority Data
Aug. 22, 2017 (DE) ..................... 10 2017 214 650.8

(51) Int. Cl.
*G01C 21/36* (2006.01)
*G05D 1/02* (2020.01)
(Continued)

(52) U.S. Cl.
CPC ........... *G05D 1/028* (2013.01); *B62D 15/027* (2013.01); *B62D 15/0285* (2013.01);
(Continued)

(58) Field of Classification Search
None
See application file for complete search history.

(56) References Cited

U.S. PATENT DOCUMENTS

| 5,304,980 A | * | 4/1994 | Maekawa | ................. B60R 1/00 340/435 |
| 7,353,089 B1 | | 4/2008 | McEvoy | |

(Continued)

FOREIGN PATENT DOCUMENTS

| DE | 19902512 A1 | 8/2000 |
| DE | 102009051463 A1 | 5/2011 |

(Continued)

OTHER PUBLICATIONS

Search Report for German Patent Application No. 10 2017 214 650.8; dated Apr. 16, 2018.

*Primary Examiner* — Anshul Sood
(74) *Attorney, Agent, or Firm* — Barnes & Thornburg LLP

(57) ABSTRACT

A method for operating a transportation vehicle wherein an electronic computing device of the transportation vehicle is coupled with a mobile electronic terminal device located outside of the transportation vehicle, and the electronic computing device receives a follow signal provided by the mobile electronic terminal device, which characterizes a follow request to the transportation vehicle, receives at least one piece of object information from an environment sensor system, moves the transportation vehicle as a function of the follow signal and as a function of the at least one piece of object information, transmits the at least one piece of object information to the mobile electronic terminal device, receives allocation information provided by the mobile electronic terminal device, and moves the transportation vehicle as a function of the allocation information.

17 Claims, 3 Drawing Sheets

(51) Int. Cl.
  *H04Q 9/00* (2006.01)
  *G05D 1/00* (2006.01)
  *B62D 15/02* (2006.01)

(52) U.S. Cl.
  CPC ......... *G01C 21/362* (2013.01); *G05D 1/0016* (2013.01); *G05D 1/0248* (2013.01); *G05D 1/0255* (2013.01); *H04Q 9/00* (2013.01); *G05D 2201/0213* (2013.01); *G08C 2201/93* (2013.01); *H04Q 2209/40* (2013.01); *H04Q 2209/50* (2013.01)

(56) References Cited

U.S. PATENT DOCUMENTS

| | | | |
|---|---|---|---|
| 10,935,990 | B2 | 3/2021 | Friedmann et al. |
| 2012/0316680 | A1 | 12/2012 | Olivier, III et al. |
| 2015/0025708 | A1* | 1/2015 | Anderson .......... A61B 5/02055 701/2 |
| 2015/0239473 | A1* | 8/2015 | Gosset ................. G01D 5/3473 701/408 |
| 2016/0018228 | A1 | 1/2016 | Parker et al. |
| 2016/0018822 | A1 | 1/2016 | Nevdahs et al. |
| 2020/0041992 | A1* | 2/2020 | Nagashima ........... G06F 3/0488 |

FOREIGN PATENT DOCUMENTS

| | | |
|---|---|---|
| DE | 102011120991 A1 | 1/2013 |
| DE | 102012022087 A1 | 5/2014 |
| DE | 112014001056 T5 | 12/2015 |
| DE | 102015113445 A1 | 1/2017 |
| DE | 102015010178 A1 | 2/2017 |
| DE | 102015017143 A1 | 2/2017 |
| JP | 2006256382 A | 9/2006 |
| WO | 2007131299 A1 | 11/2007 |
| WO | 2014148980 A1 | 9/2014 |
| WO | 2016127192 A1 | 8/2016 |
| WO | 2016144765 A1 | 9/2016 |
| WO | 2017138920 A1 | 8/2017 |

* cited by examiner

METHOD FOR OPERATING A TRANSPORTATION VEHICLE AND TRANSPORTATION VEHICLE

PRIORITY CLAIM

This patent application claims priority to German Patent Application No. 10 2017 214 650.8, filed 22 Aug. 2017, the disclosure of which is incorporated herein by reference in its entirety.

SUMMARY

Illustrative embodiments relate to a method for operating a transportation vehicle and a transportation vehicle.

BRIEF DESCRIPTION OF THE DRAWINGS

Described below is an exemplary embodiment in which.

DETAILED DESCRIPTION

Figure 1:
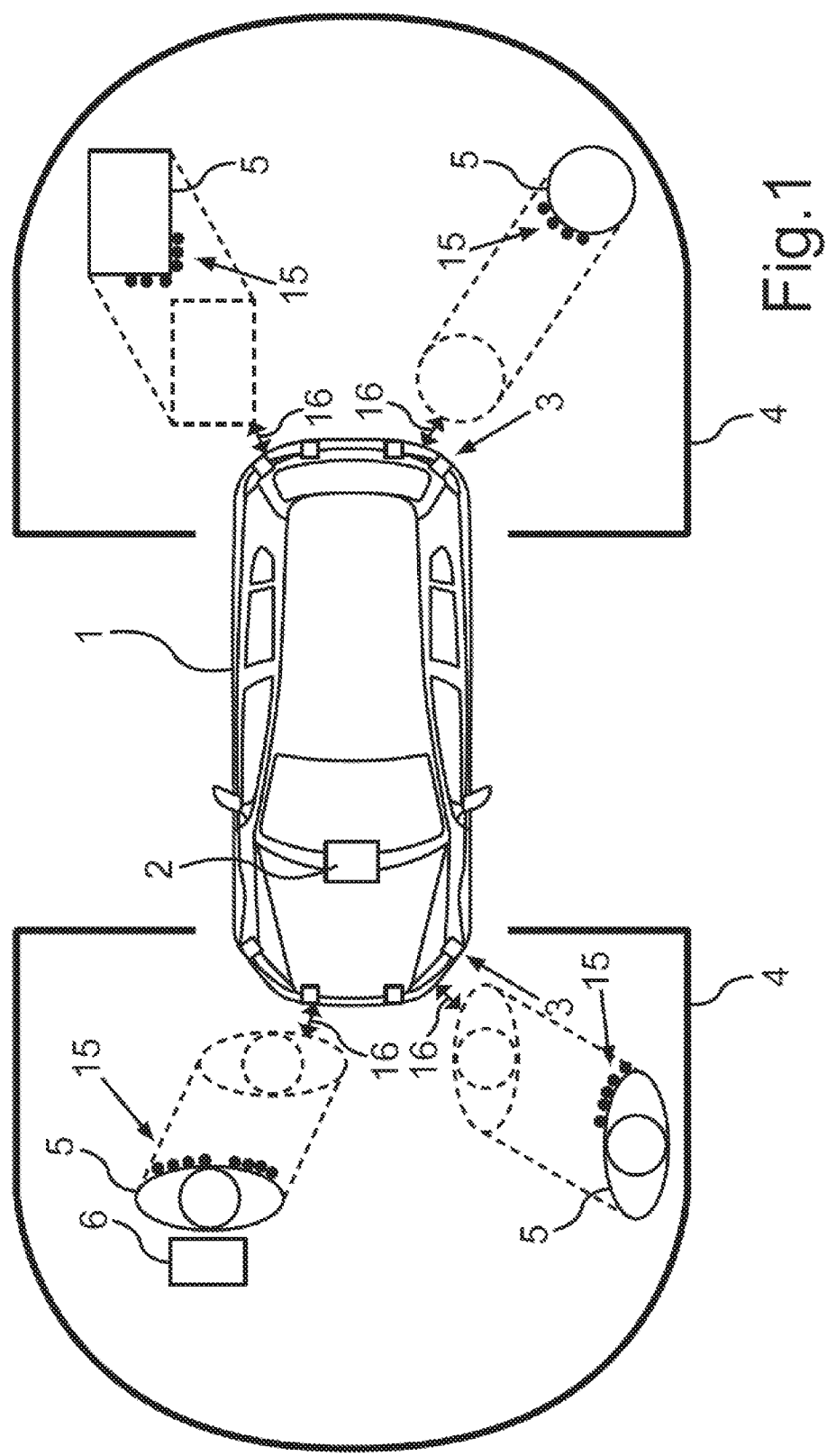
FIG. 1 is a schematic top view of a transportation vehicle with an electronic computing device and with an environment sensor system which can be used to acquire respective objects located within a defined maximum distance from the transportation vehicle.

A method for operating a transportation vehicle is already known from DE 10 2011 120 991 A1. In the method, a delivery agent is supported while delivering goods by a delivery transportation vehicle. The delivery transportation vehicle here has an automatic driving mode, in which it wirelessly communicates with a mobile control device for controlling the automatic driving mode. The delivery transportation vehicle can here be operated in the automatic driving mode by a follow-up function, in which the delivery transportation vehicle automatically follows a movement of the mobile control device from a stopping point. The automatic driving mode can be triggered by pressing a function key of the mobile control device, which is connected with the delivery transportation vehicle. In the automatic driving mode, the delivery transportation vehicle accompanies the delivery agent or drives toward him or her. The delivery transportation vehicle here moves toward the mobile control device on a predefined delivery route. The delivery transportation vehicle further has environment sensors directed toward the front in the traveling direction, which detect obstacles in a traveling path of the delivery transportation vehicle. When an obstacle is detected in the traveling path, the automatic driving mode is ended, and the delivery transportation vehicle is brought to a stop.

Also known from US 2016/0018228 A1 is a method for operating a follow transportation vehicle. In the method, the follow transportation vehicle is placed behind a transportation vehicle which the follow transportation vehicle is intended to follow. An image of an environment of the follow transportation vehicle recorded by a camera of the follow transportation vehicle is then displayed on a screen in the follow transportation vehicle. The driver of the follow transportation vehicle selects the transportation vehicle on the screen that is to be followed by his or her follow transportation vehicle. This transportation vehicle to be followed is indicated as the destination for a transportation vehicle navigation system. This destination is dynamically adjusted while the transportation vehicle is moving, and instructions are provided to the driver of the follow transportation vehicle, which he or she can use to follow the transportation vehicle to be followed.

Further known from DE 199 02 512 A1 is a method for influencing a movement of a transportation vehicle by an operator, in which the transportation vehicle is rail-borne, and the transportation vehicle can use a direction-finding device to detect a position of the operator so as to automatically follow him or her. The transportation vehicle can then maintain a direction and distance from the operator by way of corresponding steering or tracking and driving electronics.

Known from DE 10 2012 022 087 A1 is a method for controlling a parking or unparking process of a transportation vehicle, in which a position of a reference device relative to the transportation vehicle is determined by a rotating electromagnetic field. The reference device can be used to automatically park or unpark the transportation vehicle. In the method, the reference device is identified by transmitting identification information by modulating the electromagnetic field. The transportation vehicle can then follow a user carrying the reference device during the automatic parking or unparking process.

Disclosed embodiments provide a method for operating a transportation vehicle which makes the transportation vehicle especially easy to control by an electronic computing device via a mobile electronic terminal device.

This is achieved by a method for operating a transportation vehicle as well as by a transportation vehicle.

A first disclosed embodiment involves a method for operating a transportation vehicle, in which an electronic computing device of the transportation vehicle is coupled with a mobile electronic terminal device located outside of the transportation vehicle. The mobile electronic terminal device is here a smartphone and/or a tablet. The mobile electronic terminal device is thus connected with the electronic computing device of the transportation vehicle via a wireless radio connection. In addition, the electronic computing device receives a follow signal provided by the mobile electronic terminal device, which characterizes a follow request to the transportation vehicle. In other words, the mobile electronic terminal device is used to receive the follow request to the transportation vehicle from the owner of the mobile electronic terminal device, and transmit it to the electronic computing device of the transportation vehicle. In addition, the electronic computing device is used to receive at least one piece of object information from an environment sensor system, wherein the respective object information characterizes a position and a distance of an object located within a defined maximum distance from the transportation vehicle. The environment sensor system can comprise a laser device and/or a camera device and/or an ultrasound device. The environment sensor system acquires at least one object along with the accompanying position and the accompanying distance from the transportation vehicle, provided the object is located within the defined maximum distance from the transportation vehicle. The position and the distance are transmitted to the electronic computing device by the environment sensor system as the respective object information of the respective object acquired by the environment sensor system. The electronic computing device is then used to move the transportation vehicle as a function of the follow signal and as a function of the at least one piece of object information.

To make it as easy as possible to control the transportation vehicle by the mobile electronic terminal device, the disclosed embodiments provide that the electronic computing device transmit the at least one piece of object information to the mobile electronic terminal device. The electronic computing device is then used to receive allocation information provided by the mobile electronic terminal device, wherein the allocation information characterizes a selection of a respective object to be followed by the owner that can be allocated to a respective piece of object information, and the transportation vehicle is moved by the electronic computing device as a function of the allocation information.

In other words, the at least one piece of object information that characterizes the position and the distance of the respective object relative to the transportation vehicle is transmitted to the mobile electronic terminal device. The environment sensor system can here provide several pieces of object information that characterize a plurality of objects via the electronic computing device for the mobile electronic terminal device. For example, the mobile electronic terminal device can output the at least one piece of object information to the owner of the mobile electronic terminal device by a display device, in particular, by a screen. The display device is used to output all object information received from the transportation vehicle by the electronic terminal device. For example, respective relative positions and/or directions of movement of a plurality of objects can be output to the owner by the display device.

From this plurality of objects, the owner can select the object to be followed by the transportation vehicle. The object is the owner him or herself. The mobile electronic terminal device can then receive an input that characterizes the respective object to be followed from the owner, for example, by an acquisition device. In other words, the owner can characterize the object to be followed by the input, and transmit it to the mobile electronic terminal device via the acquisition device. For example, the acquisition device is a touch-sensitive surface of the screen. As a function of the input, the mobile electronic terminal device transmits the allocation information characterizing the object to be followed selected by the owner to the electronic computing device of the transportation vehicle. In this way, the electronic computing device of the transportation vehicle is informed about the object to be followed, and can allocate the respective accompanying object information to the object to be followed.

The electronic computing device then controls the transportation vehicle as a function of the object information allocated to the object to be followed. The transportation vehicle is completely automated, and thus controlled autonomously as a function of the at least one piece of object information ascertained by the environment sensor system. For example, the environment sensor system ascertains several objects located within the defined maximum distance from the transportation vehicle, and transmits respective accompanying object information to the mobile electronic terminal device. The mobile electronic terminal device presents the owner of the display device with the several objects along with their position and distance relative to the transportation vehicle, for example, by way of corresponding symbols.

The owner can press the touch-sensitive surface of the screen to select the object to be followed from the several displayed objects. After the allocation information has been transmitted to the electronic computing device of the transportation vehicle, the electronic computing device can varyingly move transportation vehicle as a function of the object information allocated to the object to be followed, and as a function of the other object information for the other objects selected as not to be followed. The electronic computing device here controls the transportation vehicle in such a way that the transportation vehicle follows the selected object, and evades other objects determined in the defined maximum distance that differ from the selected object, so as to prevent a collision between the transportation vehicle and the other objects. The electronic computing device can use the allocation information to ascertain which of the objects determined by the environment sensor system the transportation vehicle is to follow.

The computing device uses the at least one piece of object information provided by the environment sensor system to observe the object with transportation vehicle sensors, and follows the object by controlling the transportation vehicle. A continuous, and thus established connection between the transportation vehicle and the mobile electronic terminal device is here not absolutely necessary. It is sufficient to transmit the allocation information, so that the electronic computing device can ascertain which object the transportation vehicle is to follow while moving. After the object has been selected, the at least one piece of object information provided by the transportation vehicle environment sensor system is sufficient for controlling a direction of movement and/or a speed of movement of the transportation vehicle. As a consequence, the electronic computing device controls the direction of movement and/or the speed of movement as a function of the at least one piece of object information provided by the environment sensor system with respect to the object to be followed and with respect to objects to be evaded.

For example, the other objects are obstacles which the electronic computing device observes while the transportation vehicle is moving. By making his or her input, the owner can thus control how the electronic computing device moves the transportation vehicle as a function of the at least one piece of object information. What is especially beneficial about the method is that the owner can be located outside of the transportation vehicle while finely adjusting the transportation vehicle. This gives the owner an especially good overview of an environment of the transportation vehicle in which the transportation vehicle is to be maneuvered relative to objects. As opposed to a passenger located inside of the transportation vehicle, the owner can thus estimate a distance between the transportation vehicle and respective objects especially well. This enables an especially precise fine adjustment of the transportation vehicle, in particular, especially close to respective objects, since the owner can perceive a position of the transportation vehicle relative to its environment in an especially precise and comprehensive manner from outside of the transportation vehicle.

A further development of the method provides that at least two sensor devices of the environment sensor system acquire respective measuring values that characterize the object and/or an environment of the transportation vehicle and compare them with each other, and determine the object information as a function of the comparison. This means that the environment sensor system comprises the at least two sensor devices, which can be used to ascertain measuring values of the object that can be allocated to each other in each case locally and chronologically. As a consequence, the at least one piece of object information, in particular, a respective relative position of the determined objects within the maximum distance from the transportation vehicle, is ascertained by the sensor devices, and thus by the transportation vehicle environment sensor system.

To check the plausibility of the measuring values, the measuring values are compared with each other and evaluated in terms of their plausibility. The respective measuring values of the varying sensor devices for the same object are compared with each other chronologically and locally so as to validate the plausibility of the respective measuring values. The object information characterizing the object can be ascertained from the measuring values as a function of the comparison, and as a function of the respective plausibility of the measuring values. As a consequence, the object information can be ascertained in an especially accurate and precise manner Therefore, the environment sensor system can be used to acquire the environment of the transportation vehicle in an especially accurate manner, and thus with an especially low measurement error relative to the object information of the ascertained objects.

A radio connection between the transportation vehicle and the mobile electronic terminal device serves to transmit the object information ascertained by the environment sensor system, which was ascertained as a function of the measuring values or as a function of the comparison of the measuring values. As a result, the environment sensor system can be used to ascertain the object information in an especially precise manner and with an especially high reliability, and make it available for the mobile electronic terminal device via the radio connection.

Disclosed embodiments provide that the transportation vehicle be made to approach the object characterized by the allocation information by the electronic computing device up to a defined first minimum distance. This means that the transportation vehicle is made to approach the object characterized by the allocation information, which is the object selected by the owner, by the electronic computing device up to the defined first minimum distance as a function of the allocation information and as a function of the follow signal, provided a distance between the object to be followed and the transportation vehicle is found to be greater than the defined first minimum distance. If the object moves away from the transportation vehicle beyond the defined first minimum distance, the transportation vehicle is made to track the object to be followed by the electronic computing device, so as to make the transportation vehicle approach the object to be followed up to the defined first minimum distance. This makes it possible to create a "follow me" function (follow me) in an especially beneficial manner.

For example, the "follow me" function can be used to trigger and/or support a maneuvering process of the transportation vehicle, and allows the owner to guide the transportation vehicle into a parking space by the mobile electronic terminal device. By maintaining the defined minimum distance, for example, which can measure 1.5 meters, in particular, 50 centimeters, in particular, 20 centimeters, it can be ensured that neither the object characterized by the allocation information nor the owner will be damaged or injured by the transportation vehicle.

Another disclosed embodiment provides that the electronic computing device be used to stop the transportation vehicle when a defined second minimum distance from an object not characterized by the allocation information is dipped below. For example, the object not characterized by the allocation information is an obstacle from which the transportation vehicle is to maintain the defined second minimum distance, and thus is stopped if the defined second minimum distance between the transportation vehicle and the other object is dipped below. This makes it possible to avoid a collision between the transportation vehicle and the object not characterized by the allocation information, in particular, an obstacle.

In another disclosed embodiment, it has proven beneficial that the electronic computing device be used to move the transportation vehicle up to the defined first minimum distance away from the object characterized by the allocation information. This means that the electronic computing device receives the follow signal as well as allocation information characterizing the object to be followed, and, based on the object information belonging to the object to be followed, determines whether the object to be followed is located within the defined first minimum distance from the transportation vehicle. If the electronic computing device ascertains that the object to be followed is located within the defined first minimum distance, the electronic computing device moves the transportation vehicle away from the object to be followed until there is compliance with the defined first minimum distance.

For example, the mobile electronic terminal device is located within the defined first minimum distance from the transportation vehicle at a time when the mobile electronic terminal device transmits the follow signal to the electronic computing device. To ensure compliance with the defined first minimum distance from the transportation vehicle, the electronic computing device moves the transportation vehicle away from the object characterized by the allocation information until the transportation vehicle is located at a distance from the object to be followed that is greater than or equal to the first defined minimum distance. For example, this makes it possible to push the transportation vehicle into the parking space by having the owner with the mobile electronic terminal device be positioned within the defined first minimum distance from the transportation vehicle and trigger the transmission of the follow signal from the mobile electronic terminal device to the electronic computing device. For example, this allows the owner of the mobile electronic terminal device to push the transportation vehicle into the parking space.

In another disclosed embodiment, it has proven beneficial to use the electronic computing device to move the transportation vehicle with a maximum speed of 10 km/h, in particular, 5 km/h. This makes it possible to keep a braking path of the transportation vehicle especially short, and thus keep the probability of a collision between the object to be followed and the transportation vehicle especially low. For example, the object to be followed, in particular, the owner, approaches the transportation vehicle especially fast, so that, even if the electronic computing device stops the transportation vehicle especially promptly because the first defined minimum distance has been dipped below, a collision can most often be avoided due to a respective braking path of the transportation vehicle.

Another disclosed embodiment provides that the electronic computing device be used to set a speed of the transportation vehicle as a function of the distance between the transportation vehicle and the object to be followed characterized by the object information and the allocation information. This means that the electronic computing device moves the transportation vehicle at a first speed given a first distance between the transportation vehicle and the object to be followed, while the electrical computing device moves the transportation vehicle at a higher second speed by comparison to the first speed given a second distance between the transportation vehicle and the object to be followed. For example, the transportation vehicle is moved at a speed of 10 km/h given a distance of 30 m between the transportation vehicle and the object to be followed, and the transportation vehicle is moved at a speed of 5 km/h given a distance of 15 m between the transportation vehicle and the object to be followed. This enables a quick, fine adjustment of the transportation vehicle in terms of its position by the mobile electronic terminal device.

Another disclosed embodiment provides that the mobile electronic terminal device be used to receive the selection made by the owner regarding the respective object to be followed through contact between a finger of the owner and the acquisition device, in particular, the touch-sensitive surface of the mobile electronic terminal device. In other words, the acquisition device detects contact with the finger of the owner at a defined location of the acquisition device, and provides the allocation information for the electronic computing device as a function of the contact. As a consequence, the allocation information received by the electronic computing device characterizes the contact between the finger of the owner and the acquisition device of the mobile electronic terminal device. This makes it especially easy for the owner to initiate the selection and receive it by the mobile electronic terminal device.

It has here proven beneficial to use the electronic computing device to stop the transportation vehicle while receiving the allocation information, which characterizes an interruption of contact between the finger of the owner and the acquisition device of the mobile electronic terminal device. This means that the allocation information received by the electronic computing device characterizes whether contact between the finger of the owner and the acquisition device of the mobile electronic terminal device exists or does not exist. If an existing contact was determined between the finger and the acquisition device, the electronic computing device can then move the transportation vehicle. If no existing contact was determined between the finger and the acquisition device, in particular, at the defined location, the electronic computing device can stop the transportation vehicle. This makes it especially easy for the owner to control the transportation vehicle by the mobile electronic terminal device.

Another disclosed embodiment provides that a movement radius be provided for the object characterized by the allocation information, within which the electronic computing device allocates the acquired object information to the object to be followed. The movement radius is a defined tolerance range, which is stored in the electronic computing device for the object to be followed. If the electronic computing device detects an object moving within the movement radius, the electronic computing device allocates the accompanying object information to the object to be followed. The tolerance range for respective object information to be allocated to the object to be followed makes it possible to at least essentially avoid interrupting the control of the transportation vehicle by the electronic computing device. The transportation vehicle moves away from the object or follows the object to be followed as a function of the movement of the object to be followed and/or as a function of a distance between the object to be followed and the transportation vehicle.

Another disclosed embodiment provides that the transportation vehicle be finely adjusted in terms of its position relative to an entrance and/or a parking space and/or a garage. This means that the method is used to maneuver the transportation vehicle into the entrance and/or in the parking space and/or into the garage. A respective minimum distance to be kept from the object to be followed and/or from the other objects that are to be evaded by the transportation vehicle during fine adjustment can be prescribed as a function of a respective maneuvering situation in this case. The electronic computing device can use the at least one piece of object information to ascertain which maneuvering situation the transportation vehicle is in. Maneuvering situations can involve maneuvering the transportation vehicle into the entrance or into the parking space or into the garage. For example, the computing device then uses an allocation instruction to determine a respective minimum distance to be kept from the object to be followed and/or from the other object that the transportation vehicle is to evade, and controls the transportation vehicle as a function of the respective determined minimum distances in terms of its position relative to the objects. In addition, various minimum distances in the allocation instruction can be allocated to different object classes of the objects.

Consequently, the electronic computing device determines the object class of the object allocated to the object information as a function of the at least one piece of received object information. As a function of the object class of the object, the electronic computing device uses the allocation instruction to determine the minimum distance allocated to the object class, which must be maintained by the transportation vehicle relative to the object during control of the transportation vehicle. A first minimum distance from the objects belonging to the first object class must be kept given a first object class, while a second minimum distance from the objects belonging to the second object class from the first minimum distance must be kept given a second object class different from the first object class. For example, a larger minimum distance is to be maintained from moving objects than from nonmoving objects. In addition, a smaller minimum distance is to be kept from objects classified as articles than from objects classified as living beings. This makes it possible to keep the danger of a collision between the transportation vehicle and objects arranged within the maximum distance especially low.

For example, the respective minimum distance to be kept can be less than 1 meter, in particular, less than 0.5 meter, in particular, less than 0.2 meter. The smaller the prescribed minimum distance to be kept, the more accurately the transportation vehicle can be finely adjusted relative to the objects, and thus aligned especially precisely in terms of its position relative to the objects. For example, the owner can prescribe what minimum distance the transportation vehicle must at least keep relative to the object to be followed. If the object to be followed is the owner him or herself, the owner can set a minimum distance at which he or she just barely still feels safe from a collision with the transportation vehicle, thereby giving him or her a good feeling while finely adjusting the transportation vehicle regarding a freedom from collision of the fine adjustment.

A second disclosed embodiment relates to a transportation vehicle with an electronic computing device, which is set up to implement a method of the kind already described in conjunction with the disclosed method. The electronic computing device can be coupled with a mobile electronic terminal device arranged outside of the transportation vehicle. The transportation vehicle has an environment sensor system, with which at least one piece of object information can be made available for the electronic computing device, wherein the object information characterizes a position and a distance of an object located within a defined maximum distance from the transportation vehicle. The mobile electronic terminal device can be used to especially easily maneuver the transportation vehicle into a parking space via the electronic computing device by having an owner of the mobile electronic terminal device prescribe the movement of the transportation vehicle by his or her own movement.

In this context, it has proven beneficial that the environment sensor system comprise a laser device and/or a camera device and/or an ultrasound device. Both the laser device, for example, which can be a Lidar, and the ultrasound device can be used to determine a distance and a position of a respective object relative to the transportation vehicle. The camera device can be used to determine a size and possibly a type of the respective object.

Disclosed embodiments also includes further developments of the disclosed transportation vehicle, which have features as have already been described in conjunction with the further developments of the disclosed method. For this reason, the corresponding further developments of the transportation vehicle are not described again here.

In the exemplary embodiment, the described components of the embodiment each constitute individual features to be viewed as independent of each other, which further develop the disclosure in each case even independently of each other, and thus are also to be regarded as a component of the disclosure individually or in a combination other than the one shown. In addition, the described embodiment can also be enhanced with other of the already described features.

Functionally identical elements on the figures are each given the same reference number.

FIG. 1 shows a schematic top view of a transportation vehicle 1, which can be operated in an autonomous driving mode, in which the transportation vehicle 1 can be moved by an electronic computing device 2 of the transportation vehicle 1. The electronic computing device 2 can finely adjust the transportation vehicle 1 in terms of its position relative to an entrance and/or a parking space and/or a garage, so as to be autonomously arranged in the entrance and/or the parking space and/or the garage. In addition to the electronic computing device 2, the transportation vehicle 1 has an environment sensor system 3, which can be used to acquire objects 5 located in an environment 4 of the transportation vehicle 1 within a defined maximum distance from the transportation vehicle 1. The environment sensor system 3 here comprises an ultrasound device or a camera device as the sensor device. The environment sensor system 3 can have a plurality of sensor devices, which can be used to acquire respective measuring data that characterize the objects 5.

The plausibility of these measuring data acquired by the different sensor devices can be verified through mutual comparison. After the plausibility of the measuring data has been verified, the electronic computing device 2 determines at least one piece of object information that characterizes at least one object 5 as a function of the measuring data. In an alternative embodiment (not shown), the environment sensor system can comprise both the ultrasound device and the camera device, as well as a laser device. The ultrasound device can be used to determine a respective position and a respective distance between a respective object 5 and the transportation vehicle 1. In addition, the environment sensor system 3 can be used to provide the respective object information characterizing the respective position relative to the transportation vehicle 1 and the respective distance between the respective object 5 and the transportation vehicle 1 to the electronic computing device 2 from the environment sensor system 3. The respective object information can be used to move the transportation vehicle 1 by the electronic computing device 2. The electronic computing device 2 can further be coupled with a mobile electronic terminal device 6 located outside of the transportation vehicle 1.

Figure 2:
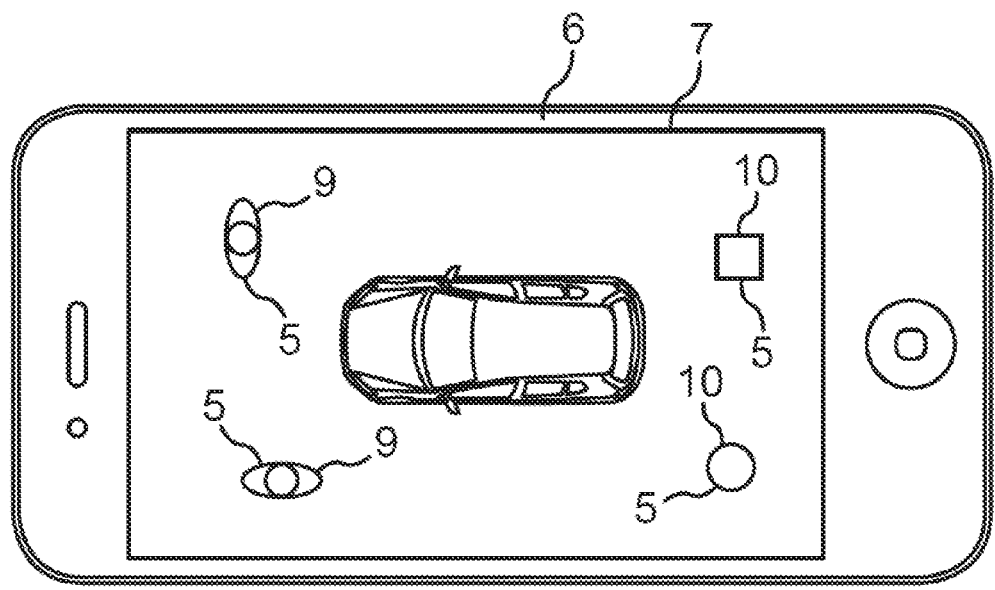
FIG. 2 is a schematic top view of a mobile electronic terminal device with a display device designed as a screen which shows the transportation vehicle and the objects acquired by the environment sensor system.
Figure 3:
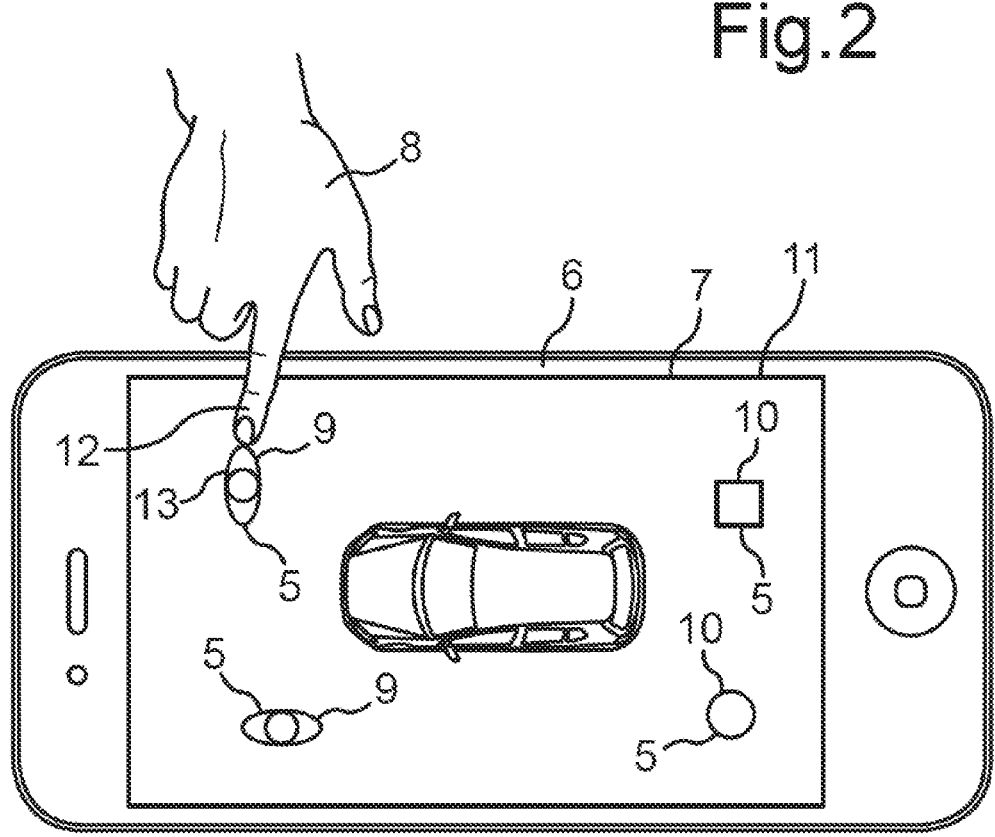
FIG. 3 is another schematic top view of the mobile electronic terminal device of FIG. 2, wherein an owner of the mobile electronic terminal device selects an object to be followed from the objects shown by the display device.
Figure 4:
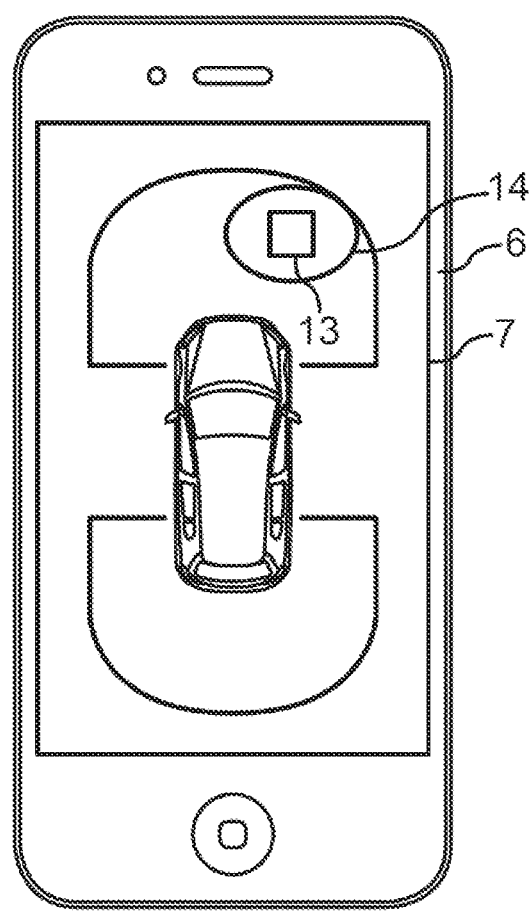
FIG. 4 is a schematic top view of the mobile electronic terminal device, wherein the display device shows the object to be followed selected by the owner with a defined movement radius.

The mobile electronic terminal device 6 on FIGS. 2-4 is shown in a respective schematic top view. The mobile electronic terminal device 6 comprises a display device 7, here a screen, via which information can be output to an owner 8 of the mobile electronic terminal device 6. Respective object information allocatable to the objects 5 can be transmitted from the electronic computing device 2 of the transportation vehicle 1 to the mobile electronic terminal device 6, and output to the owner 8 of the mobile electronic terminal device 6 via the display device 7. Symbols on the display device 7 can be used to schematically output a respective arrangement of respective objects 5 relative to the transportation vehicle 1 as well as their relative distance from the transportation vehicle 1 to the owner 8. Different symbols on the display device 7 can here be used to varyingly output moved objects 9 and resting objects 10 to the owner 8. In the present case, the moved object 9 is output with a different color than the resting object 10.

The mobile electronic terminal device 6 further comprises an acquisition device 11, which is a touch-sensitive surface of the screen, which can be used to receive an input of the owner 8. The input here involves the owner 8 pressing the touch-sensitive surface of the screen with his or her finger 12 in the area of an object 5 shown by the display device 7, so as to characterize a following command for the transportation vehicle 1 relative to the selected object 5, which is marked with reference number 13 below. The object 13 to be followed can be output on the screen in color, as contrasted with the objects 5 not to be followed.

FIG. 4 shows a schematic top view of the mobile electronic terminal device 6, wherein the display device 7 outputs to the owner 8 a position of the object 13 to be followed characterized by the input relative to the transportation vehicle 1, as well as a distance between the object 13 to be followed and the transportation vehicle 1. In addition, the display device 7 shows the owner 8 a movement radius 14 of the object 13 to be followed. The movement radius 14 describes a tolerance range in which the electronic computing device 2 connects a determined moved object 5 with the object 13 to be followed.

Figure 5:
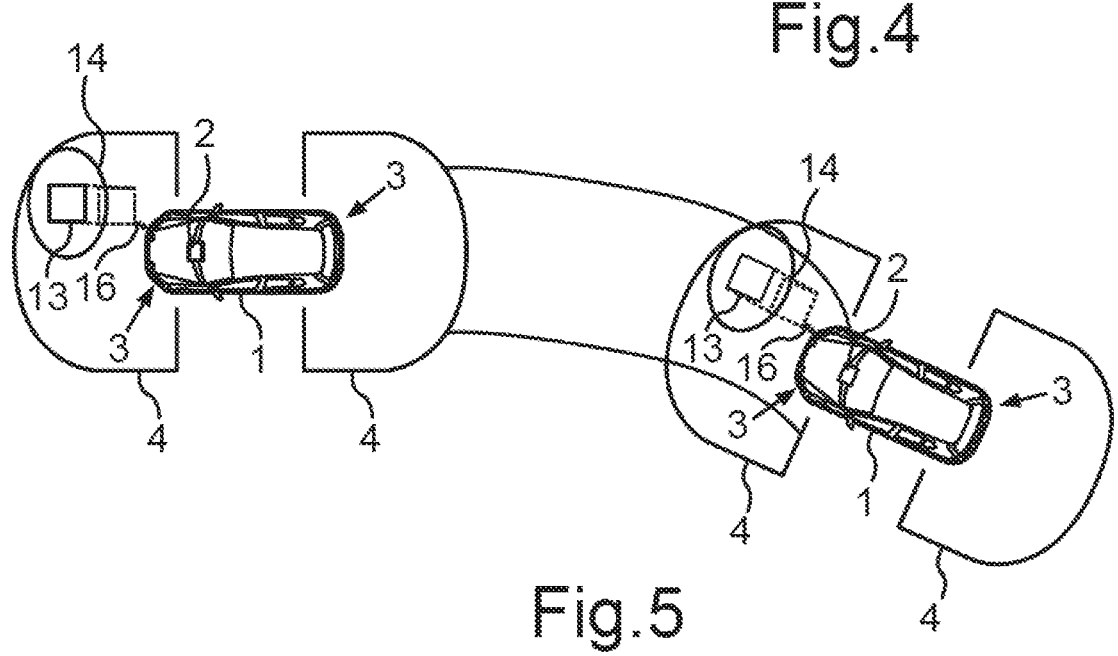
FIG. 5 is a top view of the transportation vehicle of FIG. 1, wherein the transportation vehicle is shown during a movement process while following the object to be followed.

FIG. 5 shows a schematic top view of the transportation vehicle 1 with the object 13 to be followed. The transportation vehicle 1 here follows the object 13 to be followed. The object 13 to be followed can move in its movement radius 14 without losing control by the electronic computing device 2. The transportation vehicle 1 can be made to approach the object 13 to be followed up to the defined first minimum distance 16 by the electronic computing device 2.

To operate the transportation vehicle 1, the electronic computing device 2 is coupled with the mobile electronic terminal device 6 located outside of the transportation vehicle 1. In addition, the electronic computing device 2 is used to receive a follow signal provided by the mobile electronic terminal device 6, which characterizes a follow request to the transportation vehicle 1. The follow request can here be received by the owner 8 via the input of the owner 8 made while pressing on the touch-sensitive surface of the screen by the mobile electronic terminal device 6. In the method, at least one piece of object information is further received by the environment sensor system 3 by the electronic computing device 2, wherein the respective object information characterizes the position and the distance of a respective object 5 located within the defined maximum distance from the transportation vehicle 1. In the present case, the electronic computing device 2 receives several pieces of object information that characterize the respective position and the respective distance of the what are here four objects 5 acquired by the environment sensor system 3. The respective pieces of object information are then transmitted to the mobile electronic terminal device 6, and schematically output to the owner 8 by the display device 7. A symbol of an object 5 shown by the display device 7 can change as the result of a movement by the respective object 5.

The display device 7 can be used to output the movement radius 14 allocatable and allocated to the object 13 to be followed. The environment sensor system 3 here comprises of twelve parking distance control sensors (parking distance control sensor), by which the environment 4 of the transportation vehicle 1 can be acquired. The environment sensor system 3 can further comprise at least one rear view camera as well as at least one camera device secured to a roof of the transportation vehicle 1 (top view system). The ultrasound device of the environment sensor system 3 can be used to acquire various point clouds 15, which characterize the respective objects 5. Object information provided by the environment sensor system 3 can be output both by an optical parking system display inside of the transportation vehicle 1 and by the display device 7. The optical parking system display inside of the transportation vehicle 1 can be shown by a modular infotainment kit.

The owner 8 selects the object 13 to be followed with his or her input, and the mobile electronic terminal device 6 transmits to the electronic computing device 2 a piece of allocation information that characterizes the object 13 to be followed, which is received by the electronic computing device 2. The allocation information characterizes a selection of the respective object 13 to be followed by the owner 8 that can be allocated to a respective piece of object information. The electronic computing device 2 can thus allocate the object 13 to be followed, which is characterized by the allocation information, to its accompanying object information. The transportation vehicle 1 is subsequently moved by the electronic computing device 2 as a function of the allocation information, and of the object information belonging to the object 13 to be followed. The transportation vehicle 1 can here be made to approach the object 13 to be followed characterized by the allocation information up to the defined first minimum distance 16 by the electronic computing device 2. If the defined first minimum distance 16 between the object 13 to be followed and the transportation vehicle 1 has been dipped below, the electronic computing device 2 can alternatively move the transportation vehicle 1 away from the object 13 to be followed characterized by the allocation information up to the defined first minimum distance 16. The transportation vehicle 1 can here be moved by the electronic computing device 2 at a walking speed, and in the present case at a speed of at most 10 km/h. The speed at which the transportation vehicle 1 is moved by the electronic computing device 2 can be changed or adjusted as a function of the distance between the object 13 to be followed and the transportation vehicle 1.

By pressing on one of the objects 5 shown by the display device 7, the owner 8 confirms the object 13 to be followed, and thus his or her own position relative to the transportation vehicle 1. After the object 13 to be followed has been selected, the transportation vehicle 1 is made to autonomously take off by the electronic computing device 2, and follows the owner 8 in his or her walking direction or the object 13 to be followed. To this end, the owner 8 should keep his or her finger 12 pressed down on the object 13 to be followed for its selection. If the owner 8 removes his or her finger 12 from the touch-sensitive screen of the input device 11, the electronic computing device 2 stops the transportation vehicle 1. Alternatively, the electronic computing device 2 stops the transportation vehicle 1 when the defined first minimum distance 16 between the object 13 to be followed and the transportation vehicle 1—which here measures about 50 centimeters—has been dipped below.

If the environment sensor system 3 of the transportation vehicle 1 determines that a defined second minimum distance between the transportation vehicle 1 and one of the objects 5 not involving the object 13 to be followed has been dipped below, the electronic computing device 2 stops the transportation vehicle 1 so as to avoid a collision between the transportation vehicle 1 and the respective object 5. The defined first minimum distance 16 can correspond to or differ from the defined second minimum distance.

The described method for operating the transportation vehicle 1 can here be implemented if the transportation vehicle 1 is set up to execute a remotely controlled parking process (remote parking) as well as autonomous driving controlled by the electronic computing device 2.

While operating the transportation vehicle 1 by the electronic computing device 2 and controlling the transportation vehicle 1 by the object 13 to be followed via the mobile electronic terminal device 6, maneuvering in reverse in entrances is especially easy to realize. In addition, the method enables an especially flexible control in especially numerous directions by comparison to a remotely controlled parking process (remote parking). This makes it possible to especially easily maneuver trucks in entrances.

As a whole, the example shows how the disclosed embodiments can create a follow-me function, in which the transportation vehicle 1 follows an operator, in particular, the owner 8 of the mobile electronic terminal device, who is walking next to or in front of the transportation vehicle 1.

LIST OF REFERENCE NUMBERS

1 Transportation vehicle
2 Electronic computing device
3 Environment sensor system
4 Environment
5 Object
6 Mobile electronic terminal device
7 Display device
8 Owner
9 Moved object
10 Static object
11 Acquisition device
12 Finger
13 Object to be followed
14 Movement radius
15 Point cloud
16 First minimum distance

The invention claimed is:

1. A transportation vehicle comprising:
an electronic computing device for operating the transportation vehicle, wherein the electronic computing device is communicatively coupled with a mobile electronic terminal device disposed external to the transportation vehicle; and
an environment sensor system communicatively coupled with the electronic computing device and configured to provide at least one piece of object information to the electronic computing device regarding at least one object in an environment in which the transportation vehicle is located within a predefined maximum distance from the transportation vehicle, wherein the electronic computing device is configured to:
receive, from the mobile electronic terminal device, a follow signal comprising a request for the transportation vehicle to perform a follow maneuver in relation to the at least one object in the environment in which the transportation vehicle is located within the predefined maximum distance from the transportation vehicle,
receive the at least one piece of object information, generated by the environment sensor system, wherein the at least one piece of object information comprises a position and a distance of at least one object located within the predefined maximum distance from the transportation vehicle,
transmit the at least one environment sensor system generated piece of object information to the mobile electronic terminal device to enable rendering of a graphical representation of an associated object relative to a graphical representation of the transportation vehicle on a display of the mobile electronic terminal device,
receive, from the mobile electronic terminal device, allocation information identifying a target object to be followed by the transportation vehicle, wherein the allocation information is generated based on a user selection of an object's graphical representation on the mobile electronic terminal device display to confirm the user's position relative to the transportation vehicle, and wherein the target object to be followed has an associated movement radius dictates a tolerance range in which the target object to be followed can move while maintaining control of the electronic computing device, and
control movement of the transportation vehicle as a function of the allocation information to follow the target object while continuing to receive the allocation information and to stop movement of the transportation vehicle in response to no longer receiving allocation information from the target object because the user has ceased selection, on the mobile electronic terminal device display, of the graphical representation of the object to be followed to terminate following functionality by instructing ceasing of generation and transmission of the allocation information.

2. The transportation vehicle of claim 1, wherein the environment sensor system comprises a laser device and/or a camera device and/or an ultrasound device.

3. The transportation vehicle of claim 1, wherein at least two sensor devices of the environment sensor system are used to acquire respective measuring values that comprise the object and/or an environment of the transportation vehicle and compare the respective measuring values with each other to determine the object information as a function of the comparison.

4. The transportation vehicle of claim 1, wherein the electronic computing device is configured to cause the transportation vehicle to approach the target object identified by the received allocation information up to a predefined first minimum distance.

5. The transportation vehicle of claim 1, wherein the electronic computing device is configured to cause the transportation vehicle to stop in response to a distance between the transportation vehicle and a non-target object being less than a predefined second minimum distance, and wherein the non-target object is not identified by the received allocation information and is not intended to be followed.

6. The transportation vehicle of claim 1, wherein a speed of the transportation vehicle is less than or equal to 20 km/h.

7. The transportation vehicle of claim 1, wherein the electronic computing device is configured to set a speed of the transportation vehicle based on a distance between the transportation vehicle and the target object to be followed.

8. The transportation vehicle of claim 1, wherein the user selection includes a contact between a finger of the user and the mobile electronic terminal device display.

9. The transportation vehicle of claim 1, wherein the requested follow maneuver includes positioning the transportation vehicle relative to an entrance and/or a parking space and/or a garage.

10. A method for operating a transportation vehicle, the method comprising:
communicatively coupling an electronic computing device of the transportation vehicle with a mobile electronic terminal device disposed external to the transportation vehicle;
communicatively coupling an environment sensor system with the electronic computing device, wherein the environment sensor system is configured to provide at least one piece of object information to the electronic computing device regarding at least one object in an environment in which the transportation vehicle is located within a predefined maximum distance from the transportation vehicle;
receiving, by the electronic computing device from the mobile electronic terminal device, a follow signal comprising a request for the transportation vehicle to perform a follow maneuver in relation to the at least one object in the environment in which the transportation vehicle is located within the predefined maximum distance from the transportation vehicle;
receiving, by the electronic computing device from the environment sensor system, the at least one piece of object information comprising a position and a distance of an object located within the predefined maximum distance from the transportation vehicle;
transmitting the at least one environment sensor system generated piece of object information to the mobile electronic terminal device to enable rendering of a graphical representation of an associated object relative to a graphical representation of the transportation vehicle on a display of the mobile electronic terminal device;
receiving, from the mobile electronic terminal device, allocation information identifying a target object to be followed by the transportation vehicle, wherein the allocation information is generated based on a user selection of an object's graphical representation on the mobile electronic terminal device display to confirm the user's position relative to the transportation vehicle, and wherein the target object to be followed has an associated movement radius dictates a tolerance range in which the target object to be followed can move while maintaining control of the electronic computing device; and controlling movement of the transportation vehicle as a function of the allocation information to cause the transportation vehicle to follow the target object while continuing to receive the allocation information and causing the transportation vehicle to stop movement of the transportation vehicle in response to no longer receiving the allocation information from the target object because the user has ceased selection, on the mobile electronic terminal device display, of the graphical representation of the object to be followed to terminate following functionality by instructing ceasing of generation and transmission of the allocation information.

11. The method of claim 10, wherein at least two sensor devices of the environment sensor system are used to acquire respective measuring values that comprise the object and/or an environment of the transportation vehicle and compare the respective measuring values with each other to determine the object information as a function of the comparison.

12. The method of claim 10, wherein controlling movement of the transportation vehicle includes causing the transportation vehicle to approach the target object identified by the received allocation information up to a predefined first minimum distance.

13. The method of claim 10, wherein controlling movement of the transportation vehicle includes causing the transportation vehicle to stop in response to a distance between the transportation vehicle and a non-target object being less than a predefined second minimum distance, and wherein the non-target object is not identified by the received allocation information and is not intended to be followed.

14. The method of claim 10, wherein a speed of the transportation vehicle is less than or equal to 20 km/h.

15. The method of claim 10, wherein controlling the movement of the transportation device includes setting a speed of the transportation vehicle based on a distance between the transportation vehicle and the target object to be followed.

16. The method of claim 10, wherein the user selection includes a contact between a finger of the user and the mobile electronic terminal device display.

17. The method of claim 10, wherein the requested follow maneuver includes positioning the transportation vehicle relative to an entrance and/or a parking space and/or a garage.

* * * * *